UNITED STATES PATENT OFFICE.

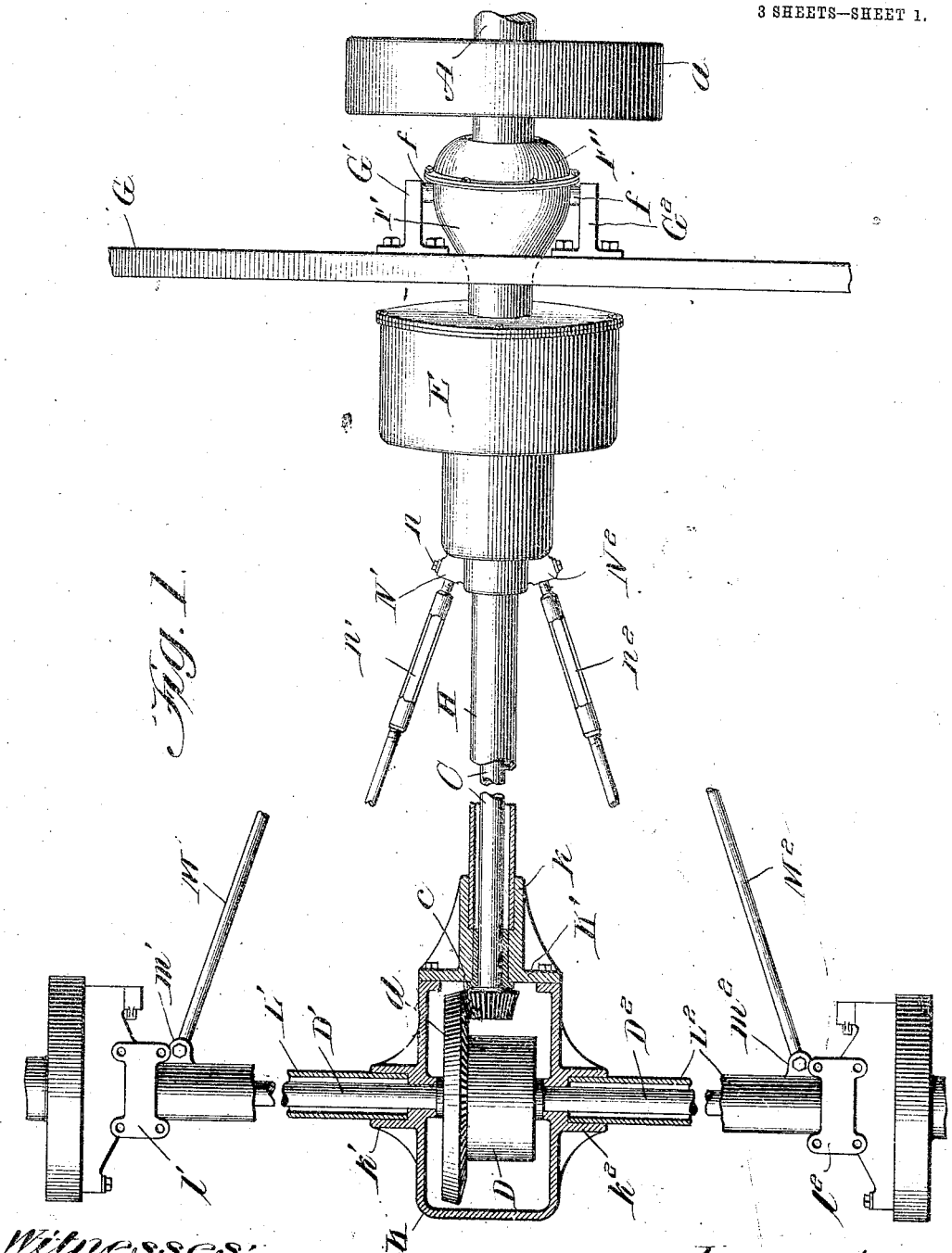

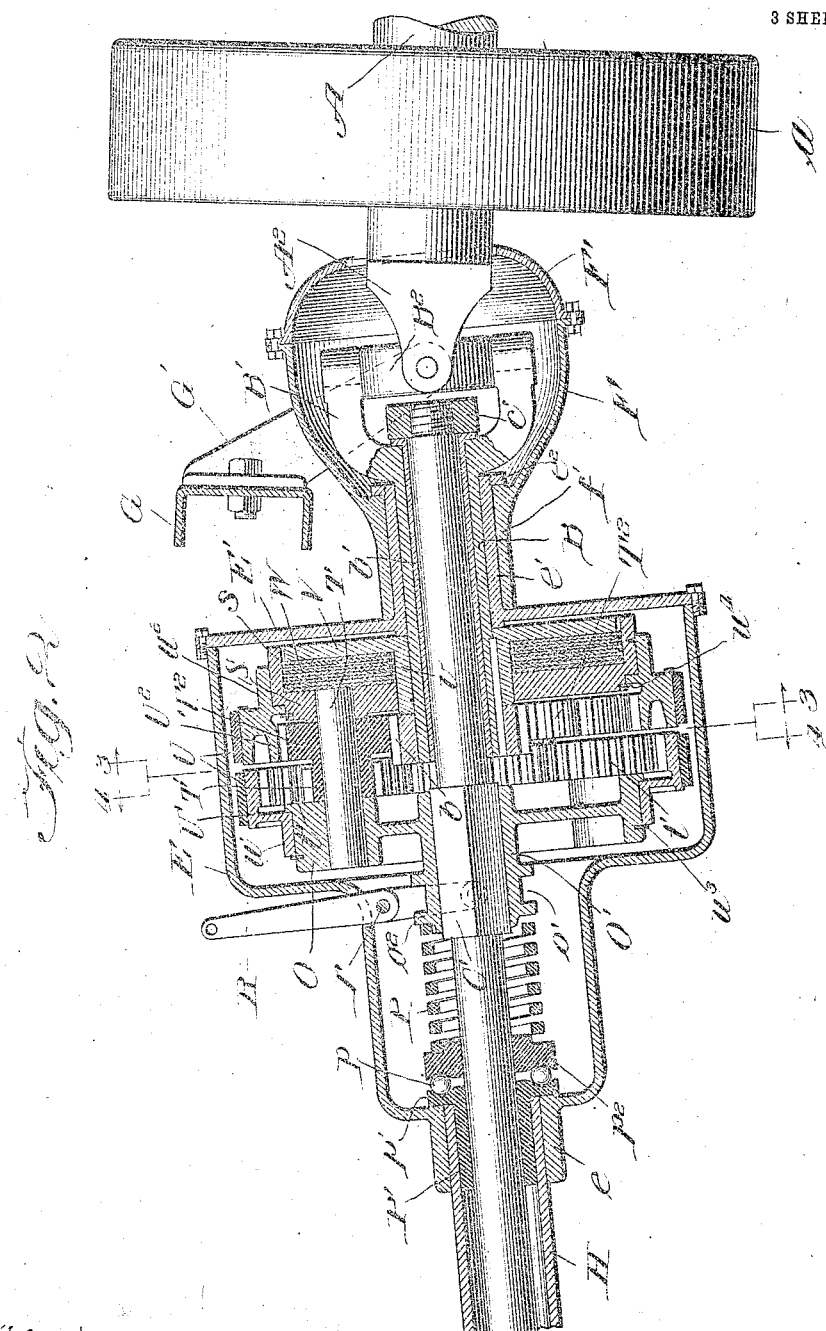

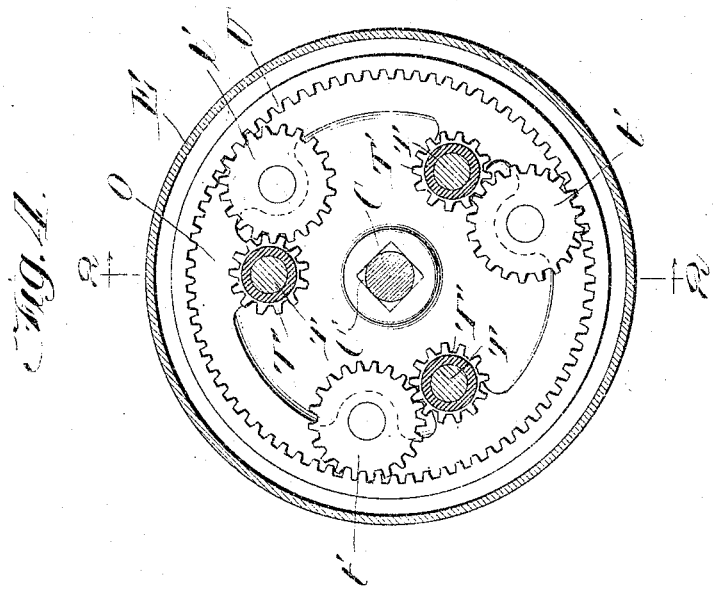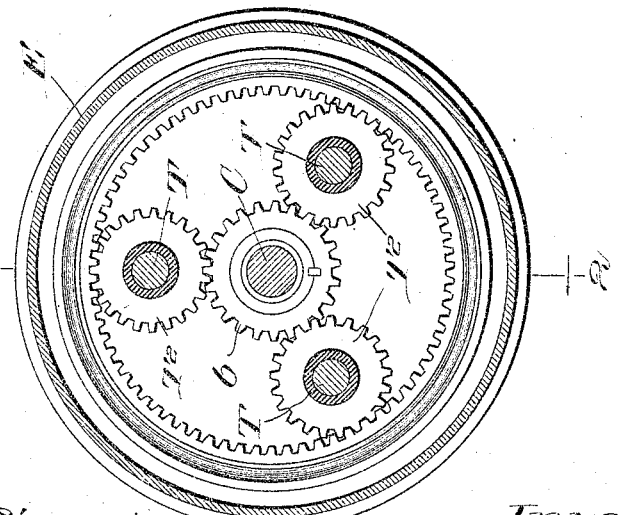

ROBERT SYMMONDS, OF KENOSHA, WISCONSIN, ASSIGNOR TO THOMAS B. JEFFERY & COMPANY, A CORPORATION OF WISCONSIN.

SPEED-CHANGING MECHANISM.

945,059.

Specification of Letters Patent. Patented Jan. 4, 1910.

Application filed June 19, 1906. Serial No. 322,368.

*To all whom it may concern:*

Be it known that I, ROBERT SYMMONDS, a citizen of the United States, residing at Kenosha, county of Kenosha, State of Wisconsin, have invented a certain new and useful Improvement in Speed-Changing Mechanism, and declare the following to be a full, clear, and exact description of the same, such as will enable others skilled in the art to which it pertains to make and use the same, reference being had to the accompanying drawings, which form a part of this specification.

My invention relates in general to power changing mechanism, and more particularly to differential gearing interposed between a motor and a driven element whereby the latter may be rotated at various speeds in one direction, or in a reverse direction.

My invention further relates to mounting the speed changing mechanism of a motor vehicle upon the driving shaft intermediate of the motor and the rear axle.

It is desirable, especially in automobiles, to so connect the motor with a driven element, which in turn is operatively connected to the rear axle of the automobile, that the speed and power transmitted from the motor may be varied at the will of the operator, and that the direction of rotation of the driven element may be reversed while the motor continues to run in the same direction. It is further desirable in motor vehicles that the transmission mechanism should be mounted directly upon the driving shaft intermediate of the engine and rear axle.

The primary object of my invention is to provide speed changing mechanism for connecting a motor to a driven element, which may be readily adjusted to inversely vary the speed and power of rotation of the element or to reverse the direction of rotation thereof.

A further object of my invention is to provide simple and practical means for mounting a transmission mechanism upon the driving shaft of a motor vehicle without imposing the weight of the mechanism upon the shaft.

A still further object of my invention is to provide speed changing mechanism and means for supporting the same upon a motor vehicle, which will be simple in construction, inexpensive in manufacture, and efficient in operation.

The embodiment of my invention herein disclosed may be generally described as comprising a driving shaft, driven shaft alining with the driving shaft, a sleeve surrounding the driven shaft, a universal joint connecting the driving shaft to said sleeve, a casing surrounding said joint, brackets fixed to the vehicle frame between which said casing is pivotally supported, a transmission mechanism casing mounted on the adjoining portions of the sleeve and driven shaft, and having a tubular extension supported within the joint casing, a tube surrounding the driven shaft and supported at one end by the transmission casing, and at its other end by the casing of the differential gearing on the rear axle, and adjustable rods flexibly secured at their forward ends to the transmission casing and at their rear ends to the tube extending from the differential casing around the rear axle.

My invention further consists in speed changing mechanism which may be generally described as comprising a driving sleeve rotatably surrounding the end of a driven shaft, a pinion fixed to said sleeve, a pinion carrier rotating with, but axially movable upon the driven shaft, a clutch interposed between the carrier and the driving sleeve, internal gear wheels mounted on the carrier, a pair of rigidly uniting pinions mounted upon the carrier, one of said united pinions meshing with the pinion on the sleeve and one of the internal gear wheels, an idle gear wheel mounted on the carrier and meshing with the other internal gear wheel and the second of said uniting pinions, means for locking said internal gear wheels against rotation, and means for moving the carrier axially to engage and disengage the clutch.

My invention will be more fully described hereinafter with reference to the accompanying drawings in which the same is illustrated as embodied in a convenient form and in which—

Figure 1 is a plan view; Fig. 2 an enlarged sectional view on line 2—2 Figs. 3 and 4; Fig. 3 a sectional view on line 3—3 Fig. 2; and Fig. 4 a sectional view on line 4—4 Fig. 2.

The same reference characters are used to designate the same parts in the several figures of the drawings.

Reference letter A designates a driving shaft, such for instance, as the crank shaft of a motor.

a indicates a fly wheel mounted upon the driving shaft. The end $A^2$ of the driving shaft is in the form of a yoke between the ends of which is pivotally supported the cross portion $B^2$ of a universal joint. The portion $B^2$ of the joint is pivotally supported within the yoke B' carried by the sleeve B.

The sleeve B rotatably surrounds the end of a driven shaft C, a bushing b' being interposed between the sleeve and the shaft. The end of the shaft C which projects within the yoke B' is provided with a nut c' to prevent the movement of the shaft axially with respect to the sleeve.

D designates the differential gearing connecting the two portions D' and $D^2$ of the rear axle of the automobile.

d indicates a large beveled gear which meshes with a small beveled gear c fixed upon the rear end of the driven shaft C thereby rotating the rear axle.

E designates a casing for inclosing the speed changing mechanism, such casing having a detachable cover E' secured thereto in any suitable manner as by bolts. The cover E' is provided with a tubular extension e' which surrounds the driving sleeve B. A removable collar $e^2$ is provided on the end of the extension e'.

F designates a housing inclosing the universal joint between the driving shaft and sleeve. The housing is provided with a tubular extension f' which surrounds the extension e' of the cover E' of the transmission casing.

The housing F is provided with a removable cover F' through which the yoke $A^2$ extends. The housing F is provided with trunions f, f pivotally supported in brackets G' and $G^2$ supported by the cross girder G of the automobile frame.

The transmission casing E is provided with a hub e formed integrally therewith in which is supported one end of a tube H surrounding the driven shaft C. The opposite end of a tube H is supported within a socket k carried by the cover K' of the casing K of the differential gearing. The casing K is provided with sockets k' and $k^2$ projecting outwardly from the side walls thereof in which are supported the ends of the tubes L' and $L^2$ surrounding the sections D' and $D^2$ of the rear axle.

l' and $l^2$ indicate the plates upon which are secured the usual automobile springs (not shown).

Rods M' and $M^2$ are provided for preventing the tube H from moving laterally. These rods are adjustable in length by means of turn buckles n' and $n^2$. The forward ends of the rods M' and $M^2$ are united by ball joints to the portion of the casing E surrounding the end of the tube H.

N' and $N^2$ designate the sockets within which the balls on the ends of the rods are retained by set screws n.

It will be observed that the horizontal journals of the housing F relieve the shaft of the weight of the casing E owing to the extension e' on the cover of the casing being supported within the tubular extension f' of the housing. These horizontal journals also permit the movement of the casing E and housing F due to the up and down movement of the rear wheels. Such movement of the wheels is also permitted by the hinged joints at the ends of the rods M' and $M^2$.

*The speed changing mechanism.*—The driven shaft C is provided with a squared portion C' within the casing E. O designates a pinion carrier having a hub O' surrounding the portion C' of the driven shaft and of a cross section to conform thereto. The hub O' is axially movable upon the shaft and is engaged by a spring P interposed between the end of the hub and a collar $p^2$ loosely surrounding the shaft. Antifriction balls p are interposed between the collar $p^2$ and a collar p' upon the end of a sleeve P' interposed between the shaft C and the tube H. In order that the pinion carrier O may be moved against the tension of the spring P a lever R is provided which is fulcrumed upon a rod r within the casing E. The lever R is provided with a yoke the ends of which extend within a groove o' in the hub O' of the pinion carrier.

A circular plate S surrounds the sleeve B and is rigidly connected to and forms part of the pinion carrier O by means of a plurality of shafts T. Each of the shafts T supports a pair of rigidly united pinions T' and $T^2$. An internal gear wheel U' is rotatably supported around the pinion carrier O by means of a flange u' interposed between a rib on the carrier and a stop ring $u^3$. A plurality of idle gears t' mounted upon the carrier mesh with the internal gear wheel U' and the several pinions T'.

A second internal gear wheel $U^2$ rotatably surrounds the plate S being supported thereon by a flange $u^2$ overlying a flange s on the plate. The internal gear is retained upon the plate by means of a rib thereon extending between a shoulder on the plate S and a detachably locking ring $u^4$. The internal gear $u^2$ meshes with the several pinions $T^2$, such pinions also meshing with a pinion b fixed upon the end of the sleeve B.

V designates a circular plate surrounding the sleeve B and fixed to rotate therewith by means of a key. The hub $v$ of the plate V extends within and supports the plate S. Interposed between the plates S and V are two series of disks W arranged alternately, one series rotating with the plate S and the other series rotating with the plate V. Suitable means are provided for locking the internal gear wheels against rotation such as bands U which may be tightened around the internal gears by any suitable mechanism (not shown).

The operation of my improved speed changing mechanism is as follows: When the parts are in the position shown in Fig. 2 the plates S and V are locked together by means of interposed disks W owing to the tension of the spring P which forces the pinion carrier toward the plate V. The driving shaft B is consequently locked to the driven shaft C so that the latter is rotated at high speed. This direct connection is effected through the plate V which is fixed to the sleeve B, the clutch disks W, the plate S and pinion carrier O, and hub O' which engages the square portion of the shaft. In order to rotate the shaft C in the same direction as the driving sleeve, but at less speed the lever R is oscillated to move the pinion carrier against the tension of the spring P and to thereby move the plate S away from the plate V so that the clutch disks are released. The internal gear $U^2$ is then locked against rotation so that the sleeve B is connected to the shaft C through the pinion $b$, pinions $T^2$ and pinion carrier O. The pinion carrier is consequently rotated and with it the shaft C in the same direction as the sleeve B but at less speed. In order to rotate the driven shaft in a reverse direction to that of the driving shaft, the clutching disks are released by means of the lever R and the internal gear wheel U' locked against rotation. The several pinions $T^2$ are rotated by the pinion $b$, and the several pinions T' rotate the engaged idle gears $t'$ within the internal gear wheel U', the result being that the pinion carrier is rotated in a reverse direction to that of the driving sleeve.

It is obvious that by oscillating the lever R to disengage the clutch disks and by disengaging the clutch bands around the internal gear wheels, the driven shaft will be disconnected from the driving sleeve so that the engine may run without propelling the vehicle.

From the foregoing description it will be observed that I have invented an improved speed changing mechanism in which the driven shaft may be directly connected to the driving shaft, in which the driven shaft can also be connected to the driving shaft through interposed speed reducing gearing, in which the driven shaft may be rotated in a reverse direction to that of the driving shaft, such different movement of the driven shaft being easily effected by extremely simple mechanical means.

It will be further observed that I have invented an improved means for supporting a transmission mechanism directly upon a shaft interposed between the motor and the rear axle of an automobile without imposing the weight of the transmission mechanism upon the shaft, and which is sufficiently flexible to permit the up and down movements of the rear wheels without injury.

Having now fully described my invention, what I claim as new and desire to secure by Letters Patent is:

1. In a speed changing mechanism, the combination with a driving element, of a driven shaft, a pinion fixed to the driving element, a pinion carrier mounted upon the driven shaft to rotate therewith, a pair of united pinions mounted upon said carrier one of which meshes with the first pinion, an idle pinion mounted upon the carrier and meshing with the other of said united pinions, an internal gear wheel rotatively supported by the carrier and meshing with said idle pinion, and means for locking said internal gear against rotation.

2. In a speed changing mechanism, the combination with a driving element, of a driven shaft, a pinion fixed to the driving element, a pinion carrier mounted upon the driven shaft to rotate therewith, a pair of united pinions mounted upon said carrier, one of which meshes with said first pinion, an idle pinion mounted upon the carrier and meshing with the other of said united pinions, an internal gear wheel rotatively supported by the carrier and meshing with said idle pinion, and means for locking said internal gear against rotation, a second internal gear wheel rotatively mounted upon said carrier and meshing with the first of said united pinions, and means for locking said second internal gear wheel against rotation.

3. In a speed changing mechanism, the combination with a driving element, of a driven shaft, a pinion fixed to the driving element, a pinion carrier mounted upon the driven shaft to rotate therewith, a pair of united pinions mounted upon said carrier one of which meshes with said first pinion, an idle pinion mounted upon the carrier and meshing with the other of said united pinions, an internal gear wheel rotatively supported by the carrier and meshing with said idle pinion, and means for locking said internal gear against rotation, and means for detachably clutching said carrier directly to the driving element.

4. In a speed changing mechanism, the combination with a driving element, of a driven shaft, a pinion fixed to the driving element, a pinion carrier mounted upon the driven shaft to rotate therewith, a pair of united pinions mounted upon said carrier one of which meshes with said first pinion, an idle pinion mounted upon the carrier and meshing with the other of said united pinions, an internal gear wheel rotatively supported by the carrier and meshing with said idle pinion, and means for locking said internal gear against rotation, a second internal gear wheel rotatively mounted upon said carrier and meshing with the first of said united pinions, and means for locking said second internal gear wheel against rotation, and means for detachably clutching said carrier directly to the driving element.

5. In a speed changing mechanism, the combination with a driving element, of a driven shaft, a pinion fixed to the driving element, a pinion carrier mounted upon the driven shaft to rotate therewith, but axially movable thereon, a clutch interposed between said carrier and the driving element, means for controlling said clutch by the axial movement of said carrier, and means interposed between said carrier and said driving element to rotate said carrier at less speed than or in an opposite direction to the rotation of the driving element.

6. In a speed changing mechanism, the combination with a driven shaft, of a driving sleeve mounted upon said shaft, a pinion fixed to the driving sleeve, a pinion carrier mounted upon the driven shaft to rotate therewith but axially movable thereon, a clutch interposed between said carrier and said driving sleeve, means for controlling said clutch by the axial movement of said carrier, and mechanism interposed between said carrier and said sleeve for rotating the carrier at less speed or in an opposite direction to the rotation of said sleeve.

7. In a speed changing mechanism, a driven shaft, a driving sleeve surrounding the driven shaft, a pinion fixed to said sleeve, a pinion carrier slidably mounted upon said driven shaft and held against rotation thereon, a clutch member fixed to said sleeve, a coöperating clutch member on said carrier, said clutch members being arranged to be brought into operative relation to each other by sliding the carrier along the driven shaft, means for sliding said carrier, an internal gear wheel rotatively mounted on the carrier, and a pinion mounted upon said carrier and meshing with said first mentioned pinion and said internal gear.

8. In a speed changing mechanism, the combination with a driving element of a driven element, a pinion fixed to said driving element, a clutch member fixed to said driving element, a pinion carrier slidably mounted on said driven element and held against rotation thereon, said carrier having a clutch member arranged to coöperate with the clutch member on the driving element, an internal gear rotatively mounted upon the carrier, a pinion supported on said carrier and meshing with said first mentioned pinion and said internal gear, and means for sliding said carrier along said driven element.

In testimony whereof, I sign this specification in the presence of two witnesses.

ROBERT SYMMONDS.

Witnesses:
Ed. Dixon,
William F. Legg.